United States Patent
Goel et al.

(10) Patent No.: US 9,986,594 B2
(45) Date of Patent: May 29, 2018

(54) IOT DEVICE TO ENABLE FAST CONNECTION BETWEEN LOW ENERGY IOT DEVICES

(71) Applicant: QUALCOMM Incorporated, San Diego, CA (US)

(72) Inventors: Amit Goel, San Diego, CA (US); Mohammed Ataur Rahman Shuman, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/572,539

(22) Filed: Dec. 16, 2014

(65) Prior Publication Data

US 2016/0174266 A1    Jun. 16, 2016

(51) Int. Cl.
   *H04B 7/00*      (2006.01)
   *H04W 76/02*     (2009.01)
   *H04W 8/00*      (2009.01)
   *H04L 29/08*     (2006.01)
   *H04W 4/00*      (2018.01)
   *H04W 52/02*     (2009.01)
   *H04W 48/16*     (2009.01)

(52) U.S. Cl.
   CPC ............ *H04W 76/10* (2018.02); *H04L 67/16* (2013.01); *H04W 4/005* (2013.01); *H04W 4/008* (2013.01); *H04W 4/70* (2018.02); *H04W 4/80* (2018.02); *H04W 8/005* (2013.01); *H04W 52/0209* (2013.01); *H04W 76/02* (2013.01); *H04W 48/16* (2013.01); *Y02B 60/50* (2013.01); *Y02D 70/00* (2018.01)

(58) Field of Classification Search
   CPC ................................................. H04W 52/0216
   USPC ........................................................ 455/41.2
   See application file for complete search history.

(56) References Cited

U.S. PATENT DOCUMENTS

| 7,865,140 B2 * | 1/2011 | Levien .................. H04W 8/186 455/41.1 |
| 2011/0258313 A1 | 10/2011 | Mallik et al. |
| 2013/0040574 A1 | 2/2013 | Hillyard |
| 2013/0069768 A1 | 3/2013 | Madhyastha et al. |

(Continued)

FOREIGN PATENT DOCUMENTS

| WO | 2012045346 A1 | 4/2012 |
| WO | 2014193557 A1 | 12/2014 |

OTHER PUBLICATIONS

International Search Report and Written Opinion—PCT/US2015/058862—ISA/EPO—dated Feb. 3, 2016.

(Continued)

*Primary Examiner* — Raj Chakraborty
(74) *Attorney, Agent, or Firm* — Muncy, Geissler, Olds & Lowe, P.C.

(57) ABSTRACT

Systems and methods for connecting a proxy device to a mobile device are disclosed. In an aspect, the proxy device continuously scans for the mobile device, wherein the mobile device broadcasts advertising messages to connect to the proxy device, connects to the mobile device in response to the mobile device coming into communication range of the proxy device, and sends information to the mobile device, the information configured to enable the mobile device to connect to a low energy device.

24 Claims, 11 Drawing Sheets

(56) References Cited

U.S. PATENT DOCUMENTS

| | | | |
|---|---|---|---|
| 2013/0237777 A1* | 9/2013 | Patel | A61B 5/0024 |
| | | | 600/301 |
| 2014/0018002 A1 | 1/2014 | Jose et al. | |
| 2014/0094123 A1* | 4/2014 | Polo | H04W 52/0216 |
| | | | 455/41.2 |
| 2015/0242764 A1* | 8/2015 | Subbaraj | G06Q 10/02 |
| | | | 705/5 |

OTHER PUBLICATIONS

QTOOTH: The oort "Internet of Everything" Hub putsBluetooth Front and Center, Tooth Wireless Living, Jun. 15, 2014, [Retrieved dated on Aug. 27, 2014], Retrieved from the Internet < URL: http://www.qtooth.com/oort-internet-everything-hub-puts-bluetooth-front-center/ >, pp. 7.

* cited by examiner

IOT DEVICE TO ENABLE FAST CONNECTION BETWEEN LOW ENERGY IOT DEVICES

TECHNICAL FIELD

Various embodiments described herein generally relate to an Internet of Things (IoT) device to enable fast connection between low energy IoT devices.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoT technologies will lead to numerous IoT devices surrounding a user at home, in vehicles, at work, and many other locations.

SUMMARY

The following presents a simplified summary relating to one or more aspects and/or embodiments associated with the mechanisms disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

The disclosure is related to connecting a proxy device to a mobile device. A method for connecting a proxy device to a mobile device includes continuously scanning, by the proxy device, for the mobile device, wherein the mobile device broadcasts advertising messages to connect to the proxy device, connecting the proxy device to the mobile device in response to the mobile device coming into communication range of the proxy device, and sending information to the mobile device, the information configured to enable the mobile device to connect to a low energy device.

An apparatus for connecting a proxy device to a mobile device includes a transceiver coupled to the proxy device. The transceiver is configured to: continuously scan for the mobile device, wherein the mobile device broadcasts advertising messages to connect to the proxy device, establish a connection between the proxy device and the mobile device in response to the mobile device coming into communication range of the proxy device, and send information to the mobile device, the information configured to enable the mobile device to connect to a low energy device.

An apparatus for connecting a proxy device to a mobile device includes logic configured to continuously scan, by the proxy device, for the mobile device, wherein the mobile device broadcasts advertising messages to connect to the proxy device, logic configured to connect the proxy device to the mobile device in response to the mobile device coming into communication range of the proxy device, and logic configured to send information to the mobile device, the information configured to enable the mobile device to connect to a low energy device.

An apparatus for connecting a proxy device to a mobile device includes means for continuously scanning, by the proxy device, for the mobile device, wherein the mobile device broadcasts advertising messages to connect to the proxy device, means for establishing a connection between the proxy device and the mobile device in response to the mobile device coming into communication range of the proxy device, and means for sending information to the mobile device, the information configured to enable the mobile device to connect to a low energy device.

A non-transitory computer-readable medium for connecting a proxy device to a mobile device includes at least one instruction to continuously scan, by the proxy device, for the mobile device, wherein the mobile device broadcasts advertising messages to connect to the proxy device, at least one instruction to connect the proxy device to the mobile device in response to the mobile device coming into communication range of the proxy device, and at least one instruction to send information to the mobile device, the information configured to enable the mobile device to connect to a low energy device.

Other objects and advantages associated with the mechanisms disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
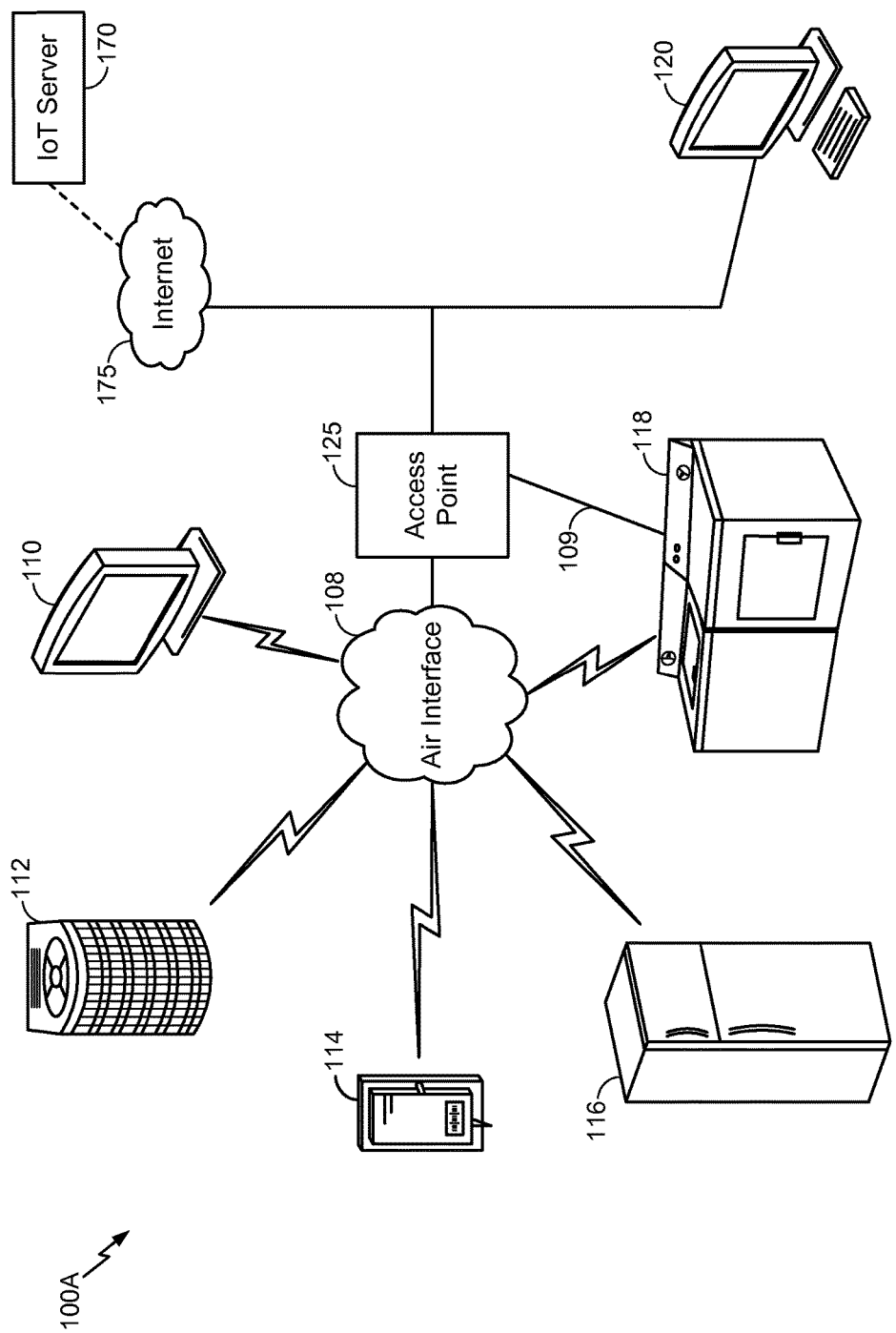
FIG. 1A illustrates a high-level system architecture of a wireless communications system in accordance with an aspect of the disclosure.

The disclosure is related to connecting a proxy device to a mobile device. In an aspect, the proxy device continuously scans for the mobile device, wherein the mobile device broadcasts advertising messages to connect to the proxy device, connects to the mobile device in response to the mobile device coming into communication range of the proxy device, and sends information to the mobile device, the information configured to enable the mobile device to connect to a low energy device.

These and other aspects are disclosed in the following description and related drawings to show specific examples relating to enabling fast connection between low energy IoT devices. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., a smartphone, an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
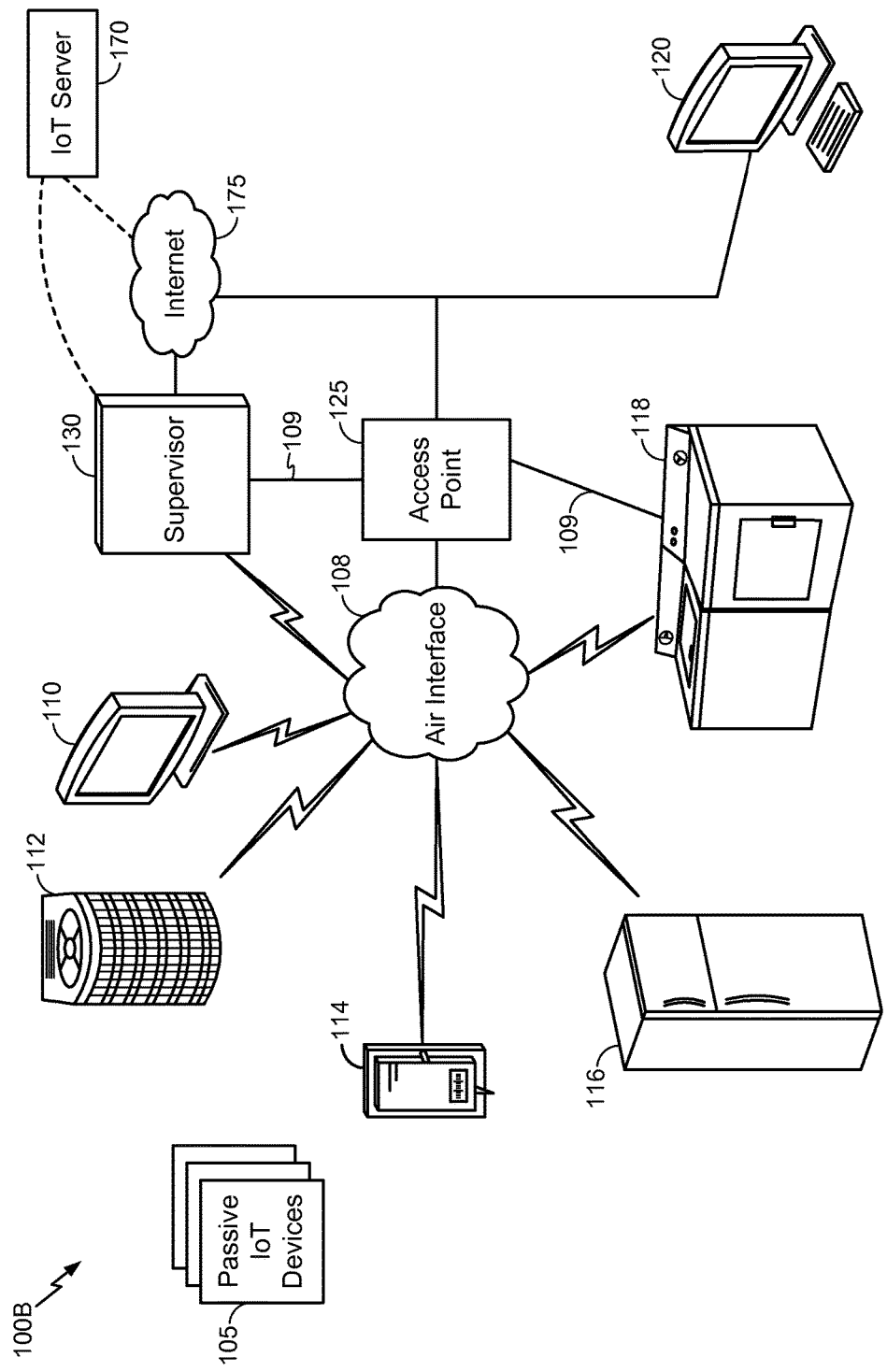
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 2A:
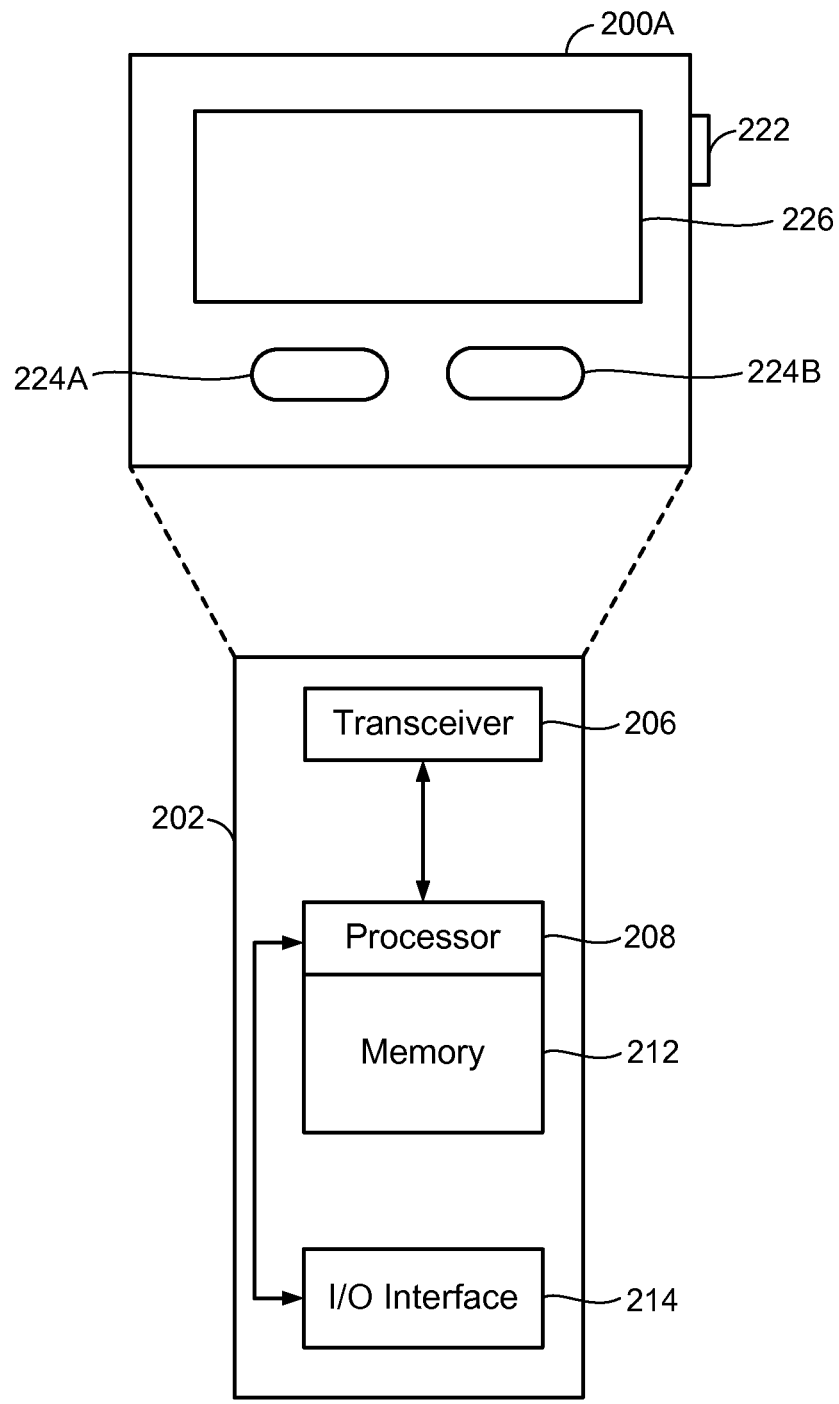

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

In an example embodiment, the IoT device 200A may correspond to a proxy device configured to facilitate a mobile device connecting to one or more low energy devices, as described herein. In that case, the transceiver 206 may be configured to continuously scan for the mobile device, where the mobile device broadcasts advertising messages to connect to the IoT device 200A, establish a connection between the IoT device 200A and the mobile device in response to the mobile device coming into communication range of the IoT device 200A, and send information to the mobile device, the information configured to enable the mobile device to connect to a low energy device of the one or more low energy devices.

The transceiver 206 may be further configured to continuously scan to detect announce messages from the one or more low energy devices and acquire information about the one or more low energy devices. Acquiring the information about the one or more low energy devices may include detecting the announce messages from the one or more low energy devices and interrogating the one or more low energy devices to acquire information about the one or more low energy devices.

In another example embodiment, the IoT device 200A may correspond to the mobile device connecting to the one or more low energy devices with the help of the proxy device, as described herein. In that case, the transceiver 206 may be configured to broadcast advertising messages to connect to the proxy device, establish a connection between the IoT device 200A and the proxy device in response to the IoT device 200A coming into communication range of the proxy device, and receive information from the proxy device, the information configured to enable the IoT device 200A to connect to a low energy device of the one or more low energy devices. These and other aspects will be discussed in greater detail below.

In yet an example embodiment, the IoT device 200A may correspond to a low energy IoT device. In that case, the transceiver 206 may be configured to transmit announce messages at a low duty cycle, establish a connection with the proxy device, and transmit information about the IoT device 200A to the proxy device. The transceiver 206 may be further configured to establish a connection with a mobile device based on the mobile device receiving information from the proxy device.

Figure 2B:
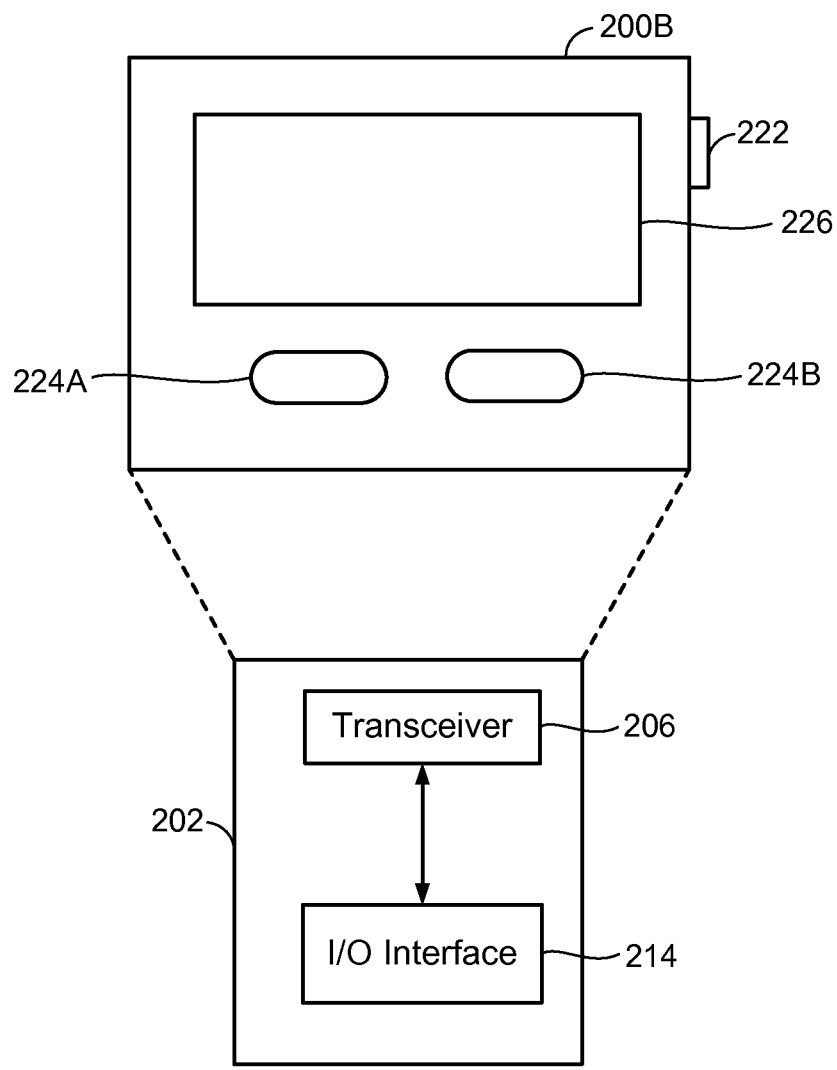
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

In an example embodiment, the IoT device 200B may correspond to a low energy IoT device. In that case, the transceiver 206 may be configured to transmit announce messages at a low duty cycle, establish a connection with the proxy device, and transmit information about the IoT device 200B to the proxy device. The transceiver 206 may be further configured to establish a connection with a mobile device based on the mobile device receiving information from the proxy device.

Figure 3:
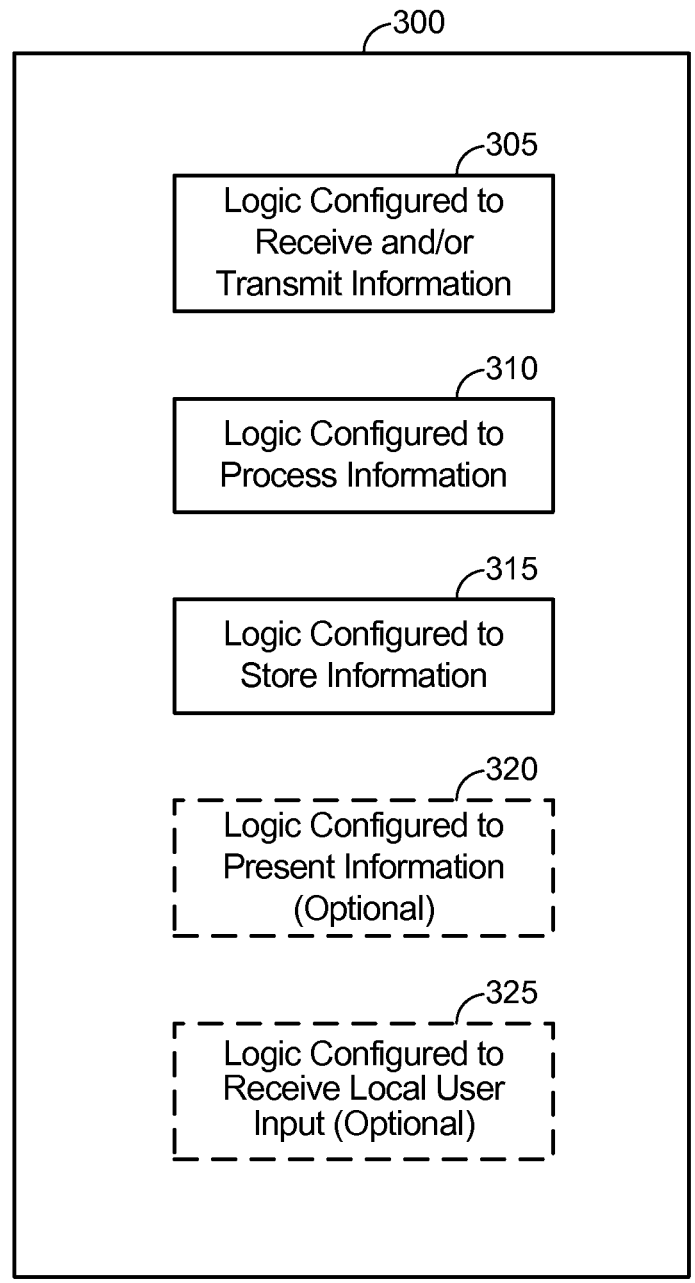
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In an example embodiment, the logic configured to receive and/or transmit information 305 may include logic configured to continuously scan, by the communication device 300, for a mobile device, wherein the mobile device broadcasts advertising messages to connect to the communication device 300, logic configured to connect the communication device 300 to the mobile device in response to the mobile device coming into communication range of the communication device 300, and logic configured to send information to the mobile device, the information configured to enable the mobile device to connect to a low energy device. In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
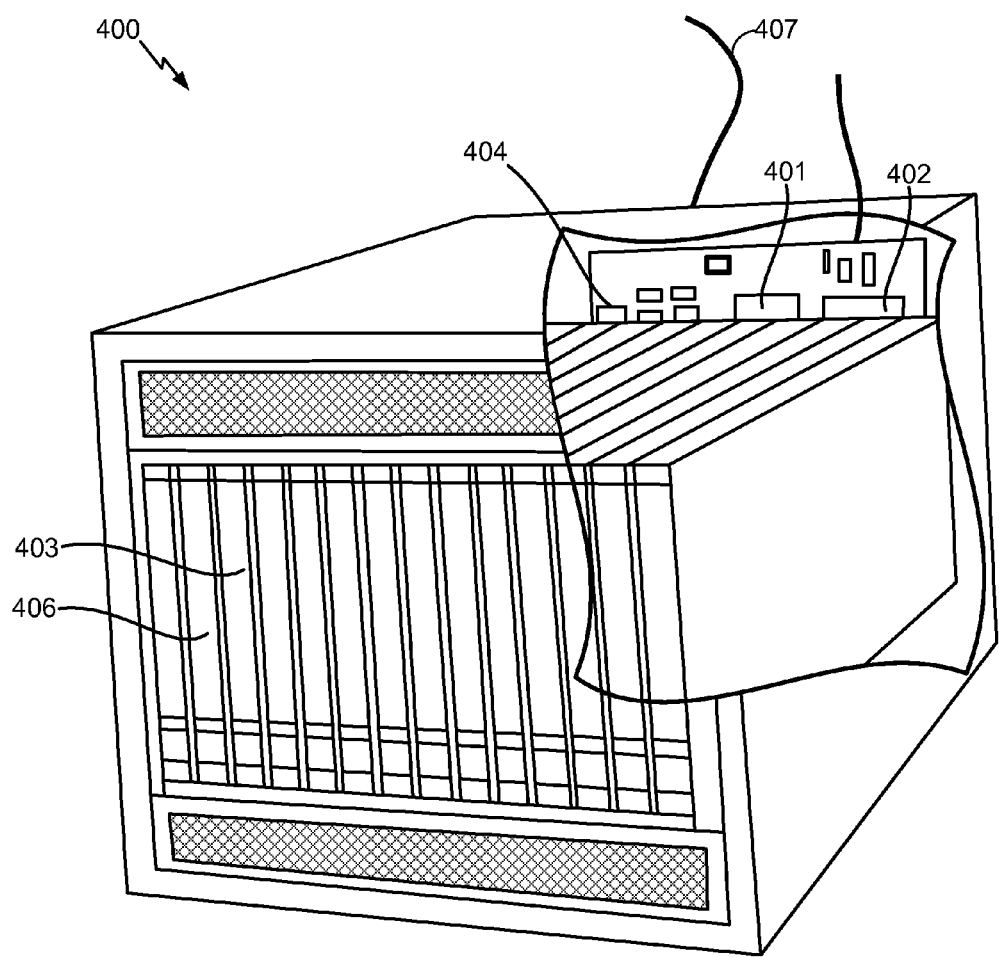
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIGS. 2A and 2B.

Certain IoT devices are designed to operate in a low energy mode in order to operate for long periods of time on a single battery charge, or on a small non-rechargeable battery, such as a coin cell battery. Such IoT devices are designed to achieve this low power consumption by employing RF, Gaussian frequency-shift keying (GFSK), Low Peak Power, packet length restrictions, etc. They may also use a low duty cycle, or low standby time, meaning the IoT devices will go into sleep mode for longer durations (e.g., 500 ms) when there is no RF current and wake up periodically to detect if other devices are trying to connect to them. Such devices include Bluetooth Low Energy (a.k.a. BLE or Bluetooth Smart) devices.

To conserve battery power, low energy IoT devices alternate between broadcasting advertising, or announce, packets and listening, or scanning, for advertising packets from other IoT devices. To establish a connection between two low energy IoT devices, one device must scan for advertising packets during a time that the other device is transmitting advertising packets. The rate at which such scanning is performed is determined by a scanning duty cycle. Similarly, the rate at which advertising packets are transmitted is determined by an advertising duty cycle. Thus, the time required to establish a connection between two low energy IoT devices is influenced by the devices' scanning duty cycle and advertising duty cycle. The higher the duty cycle, e.g., the more frequent the advertisements and the longer the scanning time, the faster the devices can connect to each other.

One of the features of low energy IoT devices is that they are able to connect to other devices very quickly (e.g., within a few milliseconds) via, for example, a BLE interface. However, this can only be achieved when one of the devices is operating at a high duty cycle (e.g., a smartphone performing an active scan). If a low energy IoT device attempts to connect to another device and both devices are operating in a low energy mode, or at a low duty cycle, the connection can take a very long time (e.g., up to several minutes, based on the intersection of both devices being awake at the same time).

Figure 5:
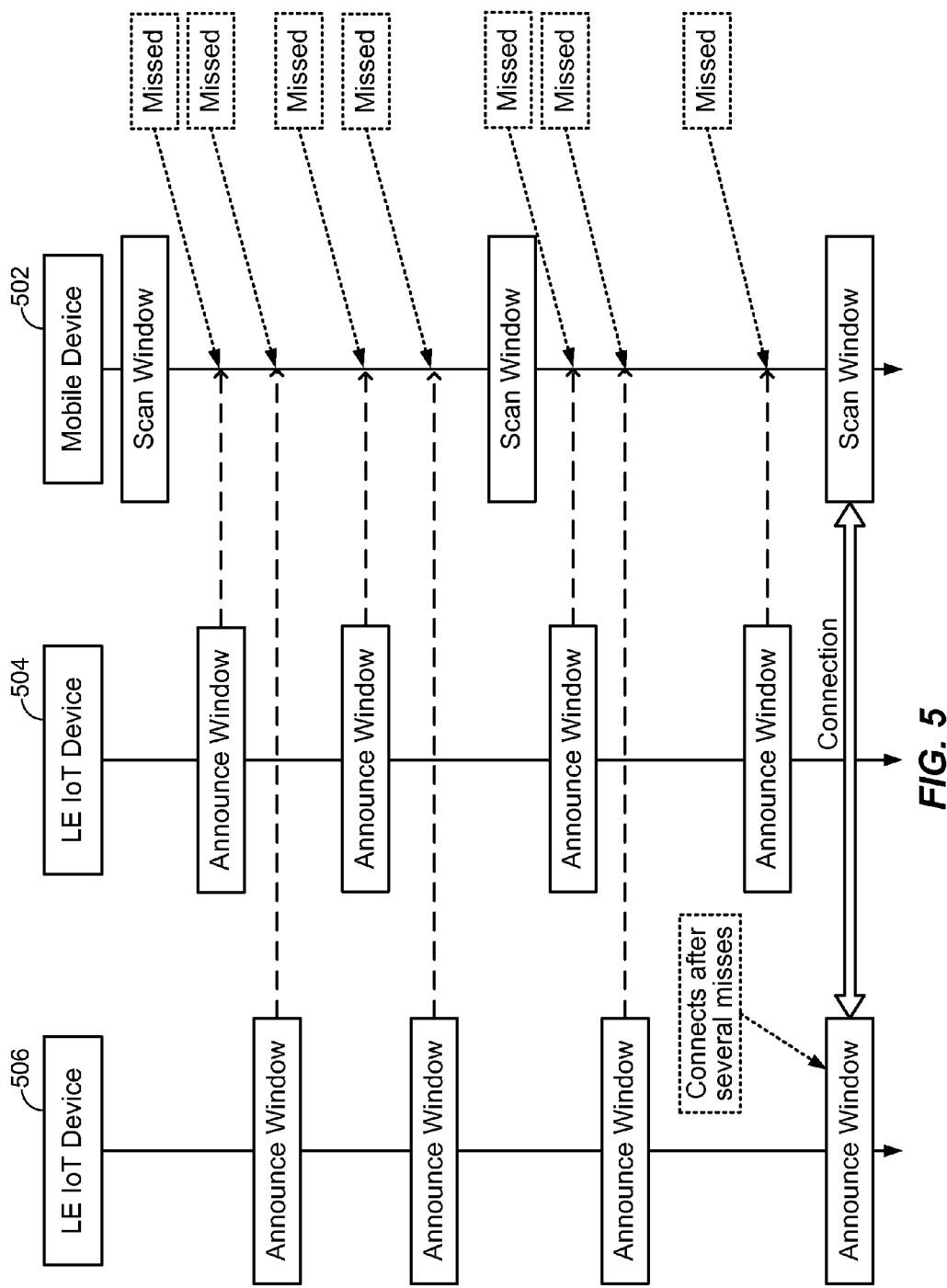
FIG. 5 is an exemplary illustration of a slow connection between IoT devices operating at a low duty cycle.

FIG. 5 is an exemplary illustration of a slow connection between IoT devices operating at a low duty cycle. In the example of FIG. 5, a mobile device 502, such as a smartphone, is performing scans at a low duty cycle (depicted as three "scan windows"), and low energy (LE) IoT devices 504/506 are advertising at a low duty cycle (depicted as four "announce windows" each). As illustrated in FIG. 5, each of mobile device 502 and low energy IoT device 504/506 scan and advertise at different frequencies. Because of this, it is not until during the fourth announce window that the low energy IoT device 506 is able to connect to the mobile device 502, and the low energy IoT device 504 is not able to connect to the mobile device 502 at all during its first four announce windows.

Such a slow connection may be undesirable in a number of situations. For example, a user may set up his or her smartphone to connect to the low energy IoT devices at the user's home without active user interaction. The user would likely prefer that the smartphone connect to the low energy IoT devices as soon as the user gets home, thereby allowing the user to immediately receive any relevant alerts from these devices. However, because the smartphone will likely be operating at a low duty cycle (e.g., due to being in a sleep mode), it may take several minutes or more for the smartphone to connect to all of the low energy IoT devices.

As another example, a user may have set up his or her smartphone to receive advertisements from nearby vendors (which can broadcast advertisements using low energy IoT devices near their storefront). However, if the user is driving in a car, the smartphone will have to be able to connect to such low energy IoT devices very quickly, as the user may be within range of these devices for less than a second.

Accordingly, the present disclosure provides for an IoT device that continuously scans or advertises in order to allow other devices, such as the user's smartphone, to connect to low energy IoT devices quickly. Such a device is referred to herein as a ConnectBeacon IoT device. The ConnectBeacon IoT device can be added to the user's home IoT network (or other relevant IoT network). For example, the functionality of the ConnectBeacon IoT device can be added to the supervisor device 130 in FIG. 1B. The ConnectBeacon IoT device is not a low energy device, but rather, is connected with power source such as USB or the like.

In an aspect, the ConnectBeacon IoT device continuously advertises for mobile devices, such as the user's smartphone, and tries to connect to them as soon as they come into range. On connecting to a mobile device, the ConnectBeacon IoT device notifies the mobile device that it has arrived in the particular network (e.g., the user's home network). This triggers the mobile device to switch from a low duty cycle scan mode to a fast duty cycle scan mode, thereby achieving a fast connection with the low energy IoT devices in that network.

Figure 6:
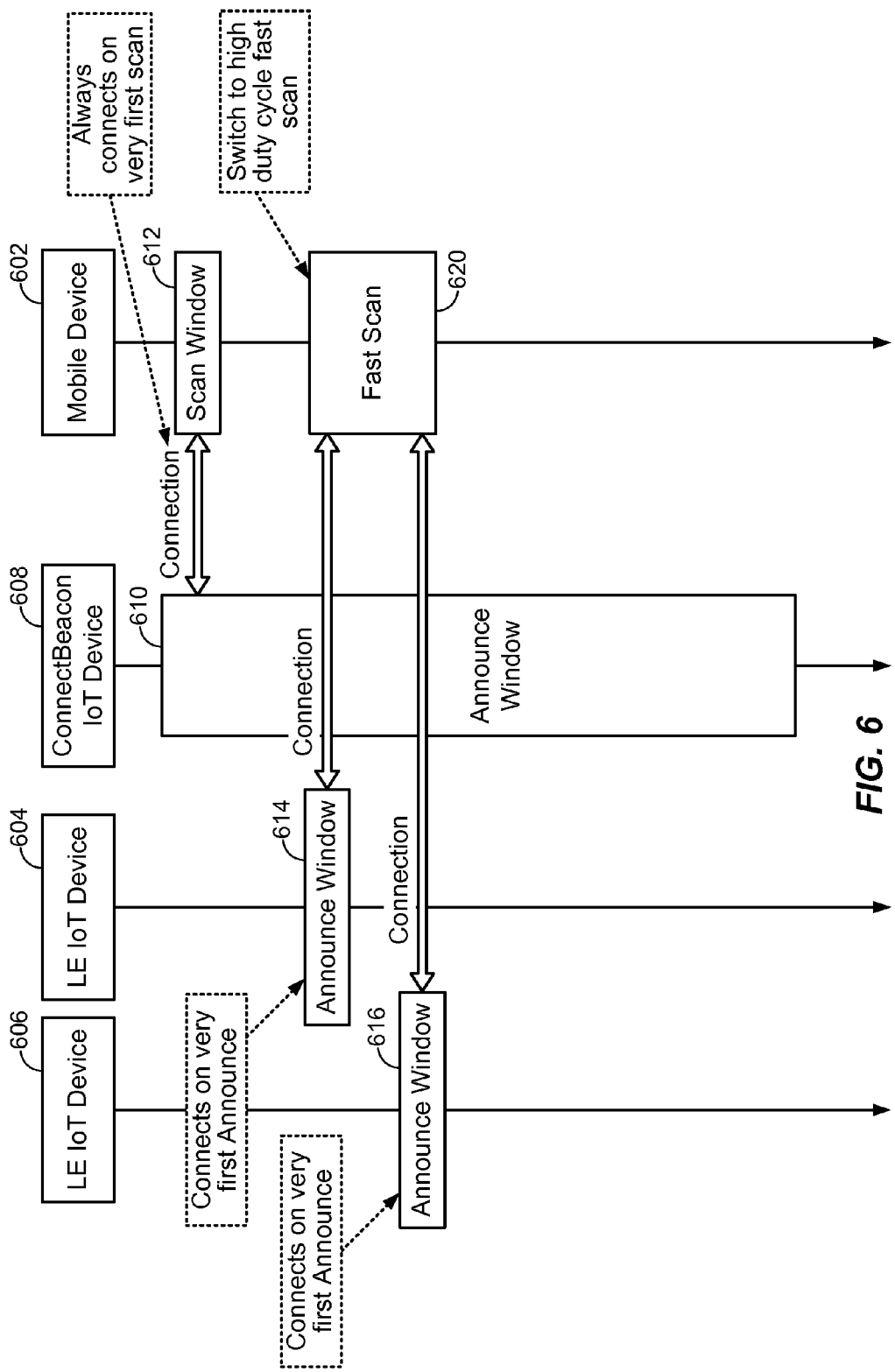
FIG. 6 is an exemplary illustration of a fast connection between IoT devices operating at a low duty cycle according to an embodiment of the disclosure.

FIG. 6 is an exemplary illustration of a fast connection between IoT devices operating at a low duty cycle according to an embodiment of the disclosure. In the example of FIG. 6, a mobile device 602, such as a smartphone, is initially performing scans at a low duty cycle (depicted as scan window 612), and low energy IoT devices 604/606 are advertising at a low duty cycle (depicted as announce windows 614 and 616, respectively). A ConnectBeacon IoT device 608 is shown as continuously advertising (depicted as announce window 610).

When the mobile device 602 comes into range of the ConnectBeacon IoT device 608, it detects the advertisement from the ConnectBeacon IoT device 608 during its first scan window, i.e., scan window 612. On connecting to the ConnectBeacon IoT device 608, the mobile device 602 is notified that it has arrived in the particular network. In response, the mobile device 602 switches from a low duty cycle scan mode (illustrated as scan window 612) to a fast duty cycle scan mode (illustrated as fast scan 620).

The low energy IoT devices 604/606 continue to advertise at a low duty cycle. However, due to the longer duty cycle scan mode (i.e., fast scan 620) of the mobile device 602, the mobile device 602 is able to receive the first advertisements (depicted as announce windows 614/616) that the low energy IoT devices transmit after the mobile device 602 switches to the fast scan mode (fast scan 620).

In another aspect, the ConnectBeacon IoT device continuously scans for mobile devices, such as the user's smartphone, and tries to connect to them as soon as they come into range. As discussed above, on connecting to a mobile device, the ConnectBeacon IoT device notifies the mobile device that it has arrived in the particular network. Again, this triggers the mobile device to switch from a low duty cycle scan mode to a fast duty cycle scan mode, thereby achieving a fast connection with the low energy IoT devices in that network.

Figure 7:
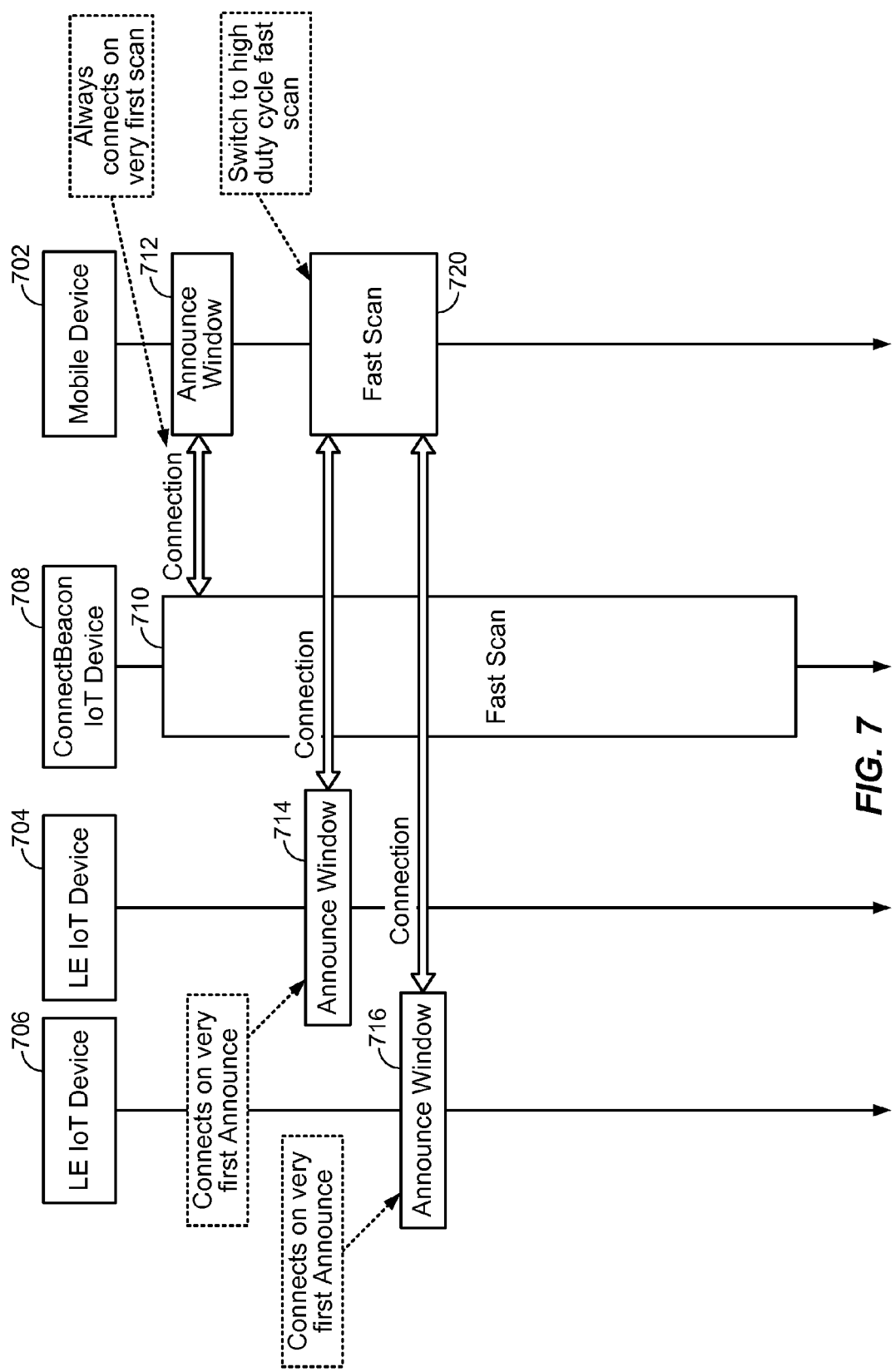
FIG. 7 is an exemplary illustration of a fast connection between IoT devices operating at a low duty cycle according to an embodiment of the disclosure.

FIG. 7 is an exemplary illustration of a fast connection between IoT devices operating at a low duty cycle according to an embodiment of the disclosure. In the example of FIG. 7, a mobile device 702 and low energy IoT devices 704/706 are advertising at a low duty cycle (depicted as announce windows 712, 714, and 716, respectively). A ConnectBeacon IoT device 708 is shown as continuously scanning (depicted as fast scan 710).

When the mobile device 702 comes into range of the ConnectBeacon IoT device 708, the the ConnectBeacon IoT device 708 detects the advertisement from the mobile device 702 during the mobile device 702's first announce window, i.e., announce window 712. On connecting to the mobile device 702, the ConnectBeacon IoT device 708 notifies the mobile device 702 that it has arrived in the particular network. In response, the mobile device 702 switches to a fast duty cycle scan mode (illustrated as fast scan 720).

The low energy IoT devices 704/706 continue to advertise at a low duty cycle. However, due to the longer duty cycle scan mode (i.e., fast scan 720) of the mobile device 702, the mobile device 702 is able to receive the first advertisements (depicted as announce windows 714/716) that the low energy IoT devices transmit after the mobile device 702 switches to the fast scan mode (fast scan 720).

Figure 8:
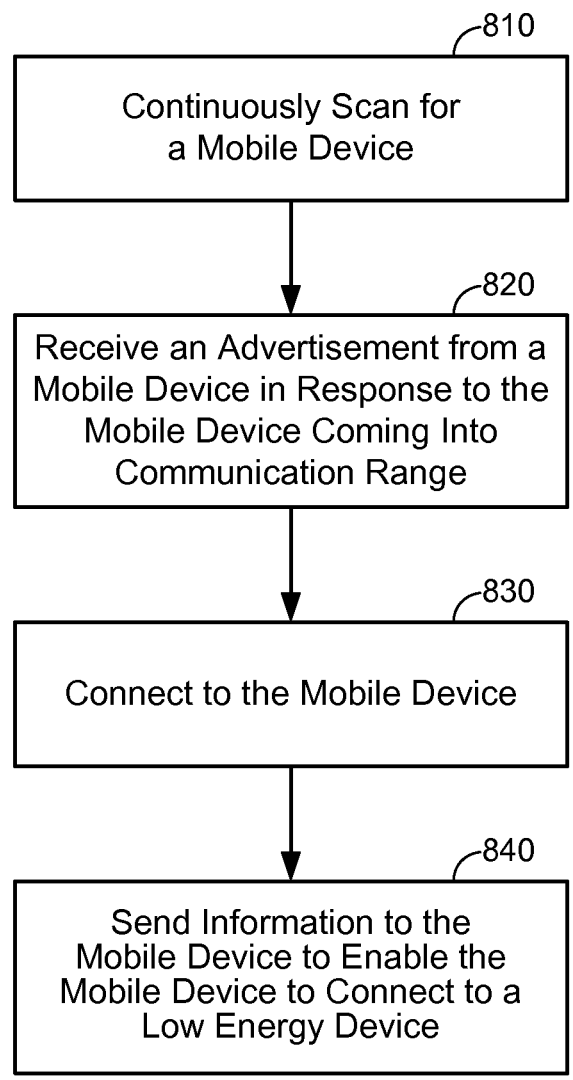
FIG. 8 illustrates an exemplary flow for providing information to a mobile device according to an embodiment of the disclosure.

In another aspect, instead of simply instructing or triggering the mobile device to enter a high duty cycle scanning mode, the ConnectBeacon IoT device can provide additional information to the mobile device to further speed up the mobile device's ability to connect to low energy IoT devices. FIG. 8 illustrates an exemplary flow of the ConnectBeacon IoT device providing such information.

At 810, as at 710 of FIG. 7, the ConnectBeacon IoT device continuously scans for a mobile device. At 820, the ConnectBeacon IoT device receives an advertising message from a mobile device in response to the mobile device coming into communication range of the ConnectBeacon IoT device. At 830, the ConnectBeacon IoT device connects to the mobile device. At 840, the ConnectBeacon IoT device sends information to the mobile device to enable the mobile device to connect to one or more low energy IoT devices connected to the same network.

Although not illustrated in FIG. 8, the ConnectBeacon IoT device may have previously retrieved information from the low energy IoT devices on the network. As discussed above, these devices broadcast announce/advertise messages at a low duty cycle. At some point, the ConnectBeacon IoT device may have connected to each of these devices to retrieve information from them. For example, the ConnectBeacon IoT device may have detected announce messages from the low energy IoT devices and interrogated them to acquire information about the devices that it can later send to the mobile device.

The information may include duty cycle information (e.g., the announce/advertise duty cycle) of the low energy IoT devices, dynamic characteristics of the low energy IoT devices, and/or static characteristics of the low energy devices. The duty cycle information may include a start time and a duration of the duty cycle. Dynamic characteristics of a low energy IoT device may include, for example, the temperature advertised by a thermostat IoT device, an alert level (e.g., volume, frequency), etc. Static characteristics of a low energy IoT device may include, for example, the periodicity of advertising, the time of the last advertisement, the make/model of the IoT device, etc.

Not all information transmitted to the mobile device by the ConnectBeacon IoT device may have been retrieved from the low energy IoT devices, however. Rather, the information may also include an instruction to switch to a high duty cycle scanning mode or to increase the current announce/advertise duty cycle. The information may also include one or more parameters indicating environmental conditions of the low energy IoT device, such as whether another user of the household connected with the low energy IoT device recently, whether the house is in a quiet mode due to a baby sleeping, etc.

As is apparent, the ConnectBeacon IoT device need not send all of the above-described information, or any information, to the mobile device. Rather, the mobile device may be programmed to automatically switch to a high duty cycle scanning mode upon connecting to the ConnectBeacon IoT device.

Additionally, the ConnectBeacon IoT device can decide which low energy IoT devices to instruct the mobile device to connect to when the mobile device connects to ConnectBeacon IoT device. For example, if a low energy IoT device, such as a water heater, is performing correctly, there is no need for the mobile device to connect to it as soon as the mobile device comes within range of the home network. Rather, the ConnectBeacon IoT device may send information to the mobile device regarding only those low energy IoT devices that have outstanding alerts. These and other rules can be pre-programmed or entered by the user.

Figure 9:
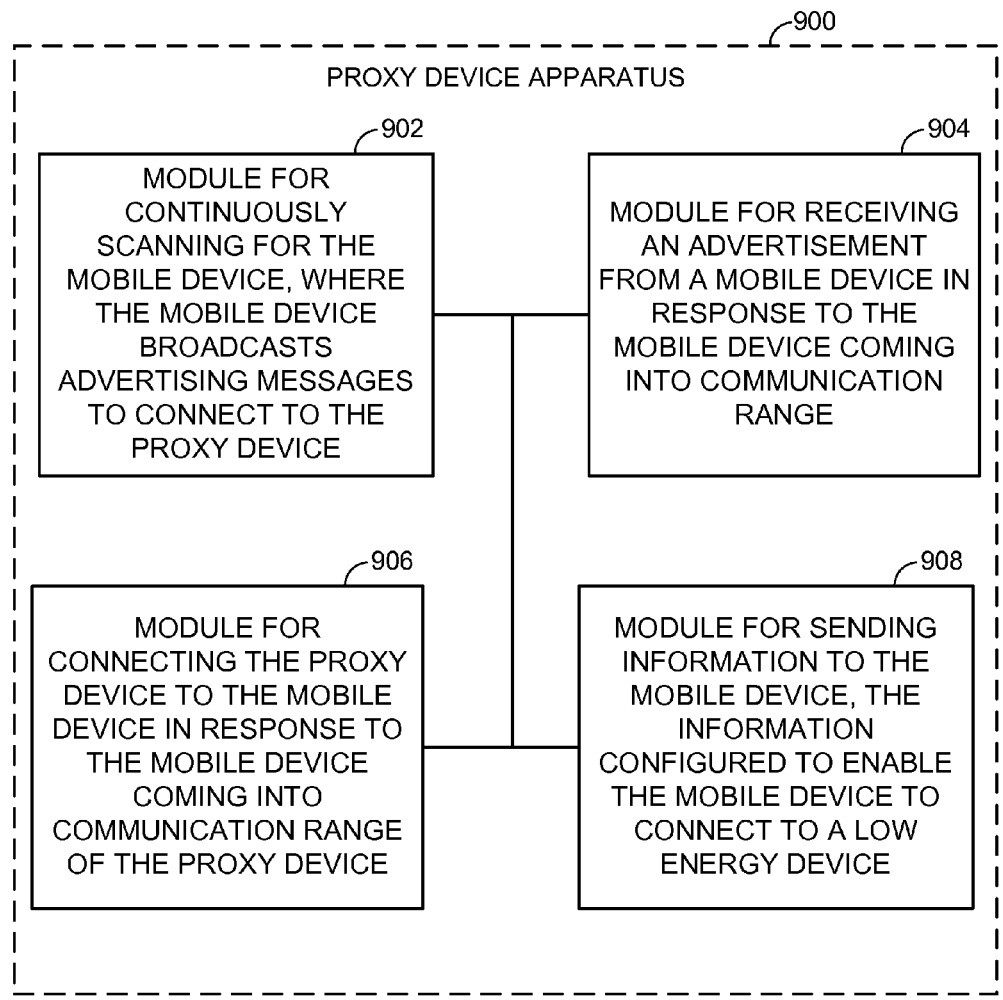
FIG. 9 is a simplified block diagram of several sample aspects of an apparatus configured to support communication as taught herein.

FIG. 9 illustrates an example base station apparatus 900 represented as a series of interrelated functional modules. A module for continuously scanning 902 may correspond at least in some aspects to, for example, a transceiver, such as transceiver 206 in FIG. 2A, as discussed herein. A module for receiving 904 may correspond at least in some aspects to, for example, a transceiver, such as transceiver 206 in FIG. 2A, as discussed herein. A module for connecting 906 may correspond at least in some aspects to, for example, a transceiver, such as transceiver 206 in FIG. 2A, as discussed herein. A module for sending 908 may correspond at least in some aspects to, for example, a transceiver, such as transceiver 206 in FIG. 2A, as discussed herein.

The functionality of the modules of FIG. 9 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 9, as well as other components and functions described herein, may be implemented using any suitable means. Such means also may be implemented, at least in part, using corresponding structure as taught herein. For example, the components described above in conjunction with the "module for" components of FIG. 9 also may correspond to similarly designated "means for" functionality. Thus, in some aspects one or more of such means may be implemented using one or more of processor components, integrated circuits, or other suitable structure as taught herein.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for connecting a mobile device to a low energy device, comprising:
   scanning, by a proxy device, to detect advertising messages from one or more low energy devices, the one or more low energy devices including the low energy device;
   acquiring, by the proxy device, information about the one or more low energy devices, wherein the information about the one or more low energy devices comprises duty cycle information for the one or more low energy devices;

continuously scanning, by the proxy device, for the mobile device, wherein the mobile device broadcasts advertising messages to connect to the proxy device, and wherein the proxy device and the one or more low energy devices are connected to each other over a communication network;

connecting the proxy device to the mobile device in response to the mobile device coming into communication range of the proxy device; and sending, by the proxy device, information to the mobile device, the information configured to enable the mobile device to instantiate a high duty cycle scanning mode to establish a wireless connection with the low energy device without an intermediary connection through the proxy device.

2. The method of claim 1, wherein the information comprises duty cycle information of the low energy device obtained from the information about the one or more low energy devices.

3. The method of claim 2, wherein the duty cycle information comprises a start time and a duration of a duty cycle of the low energy device.

4. The method of claim 1, wherein the information comprises an instruction to increase an advertising duty cycle of the mobile device.

5. The method of claim 1, wherein the high duty cycle scanning mode facilitates connection of the mobile device to the low energy device in response to a first advertising message broadcast by the low energy device after the mobile device comes within communication range of the low energy device.

6. The method of claim 1, wherein the information comprises one or more parameters indicating environmental conditions, a number of the one or more low energy devices in the communication network, dynamic characteristics of the one or more low energy devices, and/or static characteristics of the one or more low energy devices.

7. The method of claim 1, wherein acquiring the information about the one or more low energy devices comprises:
   detecting, by the proxy device, the advertising messages from the one or more low energy devices; and
   interrogating, by the proxy device, the one or more low energy devices to acquire information about the one or more low energy devices.

8. The method of claim 1, wherein the advertising messages from the one or more low energy devices are transmitted according to a low duty cycle.

9. The method of claim 1, wherein the mobile device comprises a smartphone or a tablet computer.

10. The method of claim 1, wherein the low energy device comprises a Bluetooth Low Energy device.

11. An apparatus for connecting a mobile device to a low energy device, comprising:
   a transceiver coupled to a proxy device, the transceiver configured to:
      scan to detect advertising messages from one or more low energy devices, the one or more low energy devices including the low energy device;
      acquire information about the one or more low energy devices, wherein the information about the one or more low energy devices comprises duty cycle information for the one or more low energy devices;
      continuously scan for the mobile device, wherein the mobile device broadcasts advertising messages to connect to the proxy device, and wherein the proxy device and the one or more low energy devices are connected to each other over a communication network;
      establish a connection between the proxy device and the mobile device in response to the mobile device coming into communication range of the proxy device; and
      send information to the mobile device, the information configured to enable the mobile device to instantiate a high duty cycle scanning mode to establish a wireless connection with the low energy device without an intermediary connection through the proxy device.

12. The apparatus of claim 11, wherein the information comprises duty cycle information of the low energy device obtained from the information about the one or more low energy devices.

13. The apparatus of claim 12, wherein the duty cycle information comprises a start time and a duration of a duty cycle of the low energy device.

14. The apparatus of claim 11, wherein the information comprises an instruction to increase an advertising duty cycle of the mobile device.

15. The apparatus of claim 11, wherein the high duty cycle scanning mode facilitates connection of the mobile device to the low energy device in response to a first advertising message broadcast by the low energy device after the mobile device comes within communication range of the low energy device.

16. The apparatus of claim 11, wherein the information comprises one or more parameters indicating environmental conditions, a number of low energy devices in the communication network, dynamic characteristics of the low energy devices, and/or static characteristics of the low energy devices.

17. The apparatus of claim 11, wherein the transceiver being configured to acquire the information about the one or more low energy devices comprises the transceiver being configured to:
   detect the advertising messages from the one or more low energy devices; and
   interrogate the one or more low energy devices to acquire information about the one or more low energy devices.

18. The apparatus of claim 11, wherein the advertising messages from the one or more low energy devices are transmitted according to a low duty cycle.

19. The apparatus of claim 11, wherein the mobile device comprises a smartphone or a tablet computer.

20. The apparatus of claim 11, wherein the low energy device comprises a Bluetooth Low Energy device.

21. An apparatus for connecting a mobile device to a low energy device, comprising:
   means for scanning, by a proxy device, to detect advertising messages from one or more low energy devices, the one or more low energy devices including the low energy device;
   means for acquiring, by the proxy device, information about the one or more low energy devices, wherein the information about the one or more low energy devices comprises duty cycle information for the one or more low energy devices;
   means for continuously scanning, by the proxy device, for the mobile device, wherein the mobile device broadcasts advertising messages to connect to the proxy device, and wherein the proxy device and the one or more low energy devices are connected to each other over a communication network;

means for establishing a connection between the proxy device and the mobile device in response to the mobile device coming into communication range of the proxy device; and means for sending information to the mobile device, the information configured to enable the mobile device to instantiate a high duty cycle scanning mode to establish a wireless connection with the low energy device without an intermediary connection through the proxy device.

22. The apparatus of claim 21, wherein the means for acquiring the information about the one or more low energy devices comprises:

means for detecting the advertising messages from the one or more low energy devices; and means for interrogating the one or more low energy devices to acquire information about the one or more low energy devices.

23. A non-transitory computer-readable medium for connecting a mobile device to a low energy device, comprising:

at least one instruction instructing a proxy device to scan to detect advertising messages from one or more low energy devices, the one or more low energy devices including the low energy device;

at least one instruction instructing the proxy device to acquire information about the one or more low energy devices, wherein the information about the one or more low energy devices comprises duty cycle information for the one or more low energy devices;

at least one instruction instructing the proxy device to continuously scan for the mobile device, wherein the mobile device broadcasts advertising messages to connect to the proxy device, and wherein the proxy device and the one or more low energy devices are connected to each other over a communication network;

at least one instruction instructing the proxy device to connect to the mobile device in response to the mobile device coming into communication range of the proxy device; and at least one instruction instructing the proxy device to send information to the mobile device, the information configured to enable the mobile device to instantiate a high duty cycle scanning mode to establish a wireless connection with the low energy device without an intermediary connection through the proxy device.

24. The non-transitory computer-readable medium of claim 23, wherein acquiring the information about the one or more low energy devices comprises:

at least one instruction instructing the proxy device to detect the advertising messages from the one or more low energy devices; and at least one instruction instructing the proxy device to interrogate the one or more low energy devices to acquire information about the one or more low energy devices.

* * * * *